(12) United States Patent
Andersen et al.

(10) Patent No.: US 8,200,596 B2
(45) Date of Patent: Jun. 12, 2012

(54) SPEEDING UP ANALYSIS OF COMPRESSED WEB GRAPHS USING VIRTUAL NODES

(76) Inventors: Reid Andersen, Seattle, WA (US);
Kumar Chellapilla, Sammamish, WA (US); Chinmay Karande, Bellevue, WA (US)

(*) Notice: Subject to any disclaimer, the term of this patent is extended or adjusted under 35 U.S.C. 154(b) by 598 days.

(21) Appl. No.: 12/473,428

(22) Filed: May 28, 2009

(65) Prior Publication Data

US 2010/0306158 A1      Dec. 2, 2010

(51) Int. Cl.
*G06F 17/00* (2006.01)
(52) U.S. Cl. ......................................................... 706/45
(58) Field of Classification Search ..................... 706/12, 706/20, 45, 62; 707/693, 790, 802
See application file for complete search history.

(56) References Cited

U.S. PATENT DOCUMENTS

| | | | |
|---|---|---|---|
| 7,340,467 B2 | 3/2008 | Najork | |
| 7,343,374 B2 * | 3/2008 | Berkhin ................................ | 1/1 |
| 2005/0216533 A1 * | 9/2005 | Berkhin ......................... | 707/204 |
| 2005/0256860 A1 * | 11/2005 | Eiron et al. ........................ | 707/4 |
| 2006/0282455 A1 | 12/2006 | Lee et al. | |
| 2007/0198621 A1 | 8/2007 | Lumsdaine et al. | |
| 2010/0332476 A1 * | 12/2010 | Buehrer et al. ............... | 707/737 |

OTHER PUBLICATIONS

Buerhrer, Gregory, Scalable Mining on Emerging Architectures Dissertation, 2008, The Ohio State University, pp. 1,171-194.*
Adler, et al., "Towards Compressing Web Graphs" retrieved at <<http://www.eecs.harvard.edu/~michaelm/postscripts/dcc2001b.pdf>>, Proceedings of the Data Compression, 2001, pp. 10.
Kleinberg, Jon M., "Authoritative Sources in a Hyperlinked Environment", retrieved at <<http://www.cs.cornell.edu/home/kleinber/auth.pdf>>, May 1997, pp. 33.
Najork, et al., "HITS on the Web: How does it Compare?", retrieved at <<http://research.microsoft.com/~najork/sigir2007.pdf>>, SIGIR '07, Jul. 23-27, 2007. pp. 8.
Berkhin, Pavel, "Bookmark-Coloring Algorithm for Personalized PageRank Computing", retrieved at <<http://www.internetmathematics.org/volumes/3/1/Berkhin.pdf>>, Mar. 25, 2005, Internet Mathematics vol. 3, No. 1, pp. 41-62.
Langville, et al., "Deeper Inside PageRank", retrieved at <<http://meyer.math.ncsu.edu/Meyer/PS_Files/DeeperInsidePR.pdf>>,Oct. 20, 2004. pp. 1-33.
Aktas, et al., "Personalizing PageRank Based on Domain Profiles", retrieved at <<http://maya.cs.depaul.edu/webkdd04/final/aktas.pdf>>, Proceedings of the sixth WEBKDD workshop: Webmining and Web Usage Analysis (WEBKDD'04), in conjunction with the 10th ACM, SIGKDD conference (KDD'04), Seattle, Washington, USA, Aug. 22, 2004, pp. 83-90.

* cited by examiner

*Primary Examiner* — David Vincent
(74) *Attorney, Agent, or Firm* — Mayer & Williams PC

(57) ABSTRACT

Classes of web graph algorithms are extended to run directly on virtual node-type compressed web graphs where a reduction in runtime of the extended algorithms is realized which is approximately proportional to the compression ratio applied to the original (i.e., uncompressed) graph. In the virtual node compression technique, a succinct representation of a web graph is constructed by replacing dense subgraphs by sparse ones so that the resulting compressed graph has significantly fewer edges and a relatively small number of additional nodes.

20 Claims, 8 Drawing Sheets

FIG 7

Datasets

| | Uncompressed | | Compressed | | Ratio |
|---|---|---|---|---|---|
| | # Nodes | # Edges | # Nodes | # Edges | |
| eu-2005 | 862,664 | 19,235,140 | 1,196,536 | 4,429,375 | 4.34 |
| uk-2005 | 39,459,925 | 936,364,282 | 47,482,140 | 151,456,024 | 6.18 |

FIG 8

PageRank - eu-2005

| | Uncompressed | Black-box | Markov chain |
|---|---|---|---|
| Time/Iteration (sec) | 5.37 | 1.58 | 1.50 |
| No. of Iterations | 19 | 19 | 50 |
| Speed-up | 1 | 3.40 | 1.36 |

FIG 9

PageRank - uk-2005

| | Uncompressed | Black-box | Markov chain |
|---|---|---|---|
| Time/Iteration (sec) | 263.52 | 60.80 | 60.06 |
| No. of Iterations | 21 | 21 | 53 |
| Speed-up | 1 | 4.33 | 1.74 |

| SALSA - eu-2005 | Uncompressed | Black-box | Markov chain |
|---|---|---|---|
| Time/Iteration (sec) | 5.48 | 2.37 | 1.97 |
| No. of Iterations | 91 | 91 | 100 |
| Speed-up | 1 | 2.31 | 2.70 |
| Storage reduction | 1 | 2.36 | 3.21 |

*FIG. 10*

| SALSA - uk-2005 | Uncompressed | Black-box | Markov chain |
|---|---|---|---|
| Time/Iteration (sec) | 265.94 | 84.22 | 68.80 |
| No. of Iterations | 104 | 104 | 124 |
| Speed-up | 1 | 3.16 | 3.24 |
| Storage reduction | 1 | 3.47 | 4.54 |

*FIG. 11*

SPEEDING UP ANALYSIS OF COMPRESSED WEB GRAPHS USING VIRTUAL NODES

BACKGROUND

Since the early 1990's, the World Wide Web (the "web") has grown exponentially to include billions of web pages. Web analytics is the collection and analysis of web data in order to optimize user experiences and the usage of the web. The application of web analytics can help providers and content developers understand the dynamics of the web and gain insights into how visitors interact with their websites. For example, such knowledge can improve the relevance of information on a page that is returned in response to a search query or may increase the likelihood of converting page visitors into customers in commercial settings.

In particular, analysis of the structure of the web when modeled as a web graph has improved web searching. Web graph analysis typically involves the study of the patterns of links between web pages through the application of graph theory in which the links represent edges and the pages represent nodes in the graph. Well known canonical link analysis web graph algorithms such as the HITS (HyperLink Inducted Topic Search), PageRank, and SALSA (Stochastic Approach for Link-Structure Analysis) algorithms identify the dominant eigenvector of a non-negative matrix that describes the link structure of a given network of pages and use the values of the eigenvector to assign weights to each page. The weights can then be used to rank the pages. Page ranking is typically used to infer the importance of a page on the web and is one of the factors that are commonly considered when returning results to a search query.

Compression schemes are commonly utilized to significantly reduce the number of bits-per-edge required to losslessly represent web graphs. Such compression can help reduce the memory, storage, and processor requirements when analyzing the graphs. In addition, use of compression can reduce the runtime of an algorithm which is generally desirable. However, many popular web graph algorithms are not able to run directly on compressed graphs. One approach to deal with this limitation is to decompress the compressed graph on the fly prior to application of the algorithm. While this technique can provide satisfactory results in some cases, it is generally sub-optimal because the decompression step represents an additional computational burden.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

Classes of web graph algorithms are extended to run directly on virtual node-type compressed web graphs where a reduction in runtime of the extended algorithms is realized which is approximately proportional to the compression ratio applied to the original (i.e., uncompressed) graph. In the virtual node compression technique, a succinct representation of a web graph is constructed by replacing dense subgraphs by sparse ones so that the resulting compressed graph has significantly fewer edges and a relatively small number of additional nodes.

In an illustrative example, web graph algorithms are extended using a Black-box matrix computation approach by multiplication of a vector by the adjacency matrix of the compressed web graph. An extended algorithm written in terms of the Black-box adjacency matrix multiplication will typically be iterated using the power method until it convergences to provide eigenvector values that are valid for the original graph. Using this approach speeds up each iteration so that the extended algorithm can be performed in a time period that is directly proportional to the size of the graph's compressed representation.

In another example, web graph algorithms are extended by adjusting the transition probabilities so that a stationary vector (i.e., the steady state eigenvector having an eigenvalue equal to 1) in the original web graph may be determined by computing the stationary vector of the Markov chain running on the compressed graph and then projecting and scaling the result. When iterated on the compressed web graph, the algorithms will converge to stationary vectors which can be used to compute the corresponding stationary vectors in the original graph. Time per iteration of the extended algorithm is reduced compared with the standard algorithm, although the number of power method iterations needed for convergence to a desired accuracy may increase in some cases as the virtual node compression technique may introduce longer path lengths in the compressed graph.

The extended algorithms may run on a server that supports a web graph service. The service can be configured as a back-end server to support the internal operations of an enterprise such as search provider, or be utilized to support a front-end web analytics service, for example.

Advantageously, the web graph algorithms when extended by both the Black-box multiplication and Markov chain approaches show a significant reduction in runtime on compressed web graphs of publicly available datasets while providing the same results as their standard counterparts on the original graphs. The approaches can be variously applied to several important classes of web graph algorithms including the canonical algorithms for link analysis, those for estimating the size of vertex neighborhoods, and various algorithms based on matrix-vector and random walks.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

FIG. 7 shows a table for datasets used for experimental testing of the Black-box multiplication and Markov chain algorithms; and FIGS. 8-11 show results of the experimental testing.

Like reference numerals indicate like elements in the drawings.

DETAILED DESCRIPTION

Figure 1:
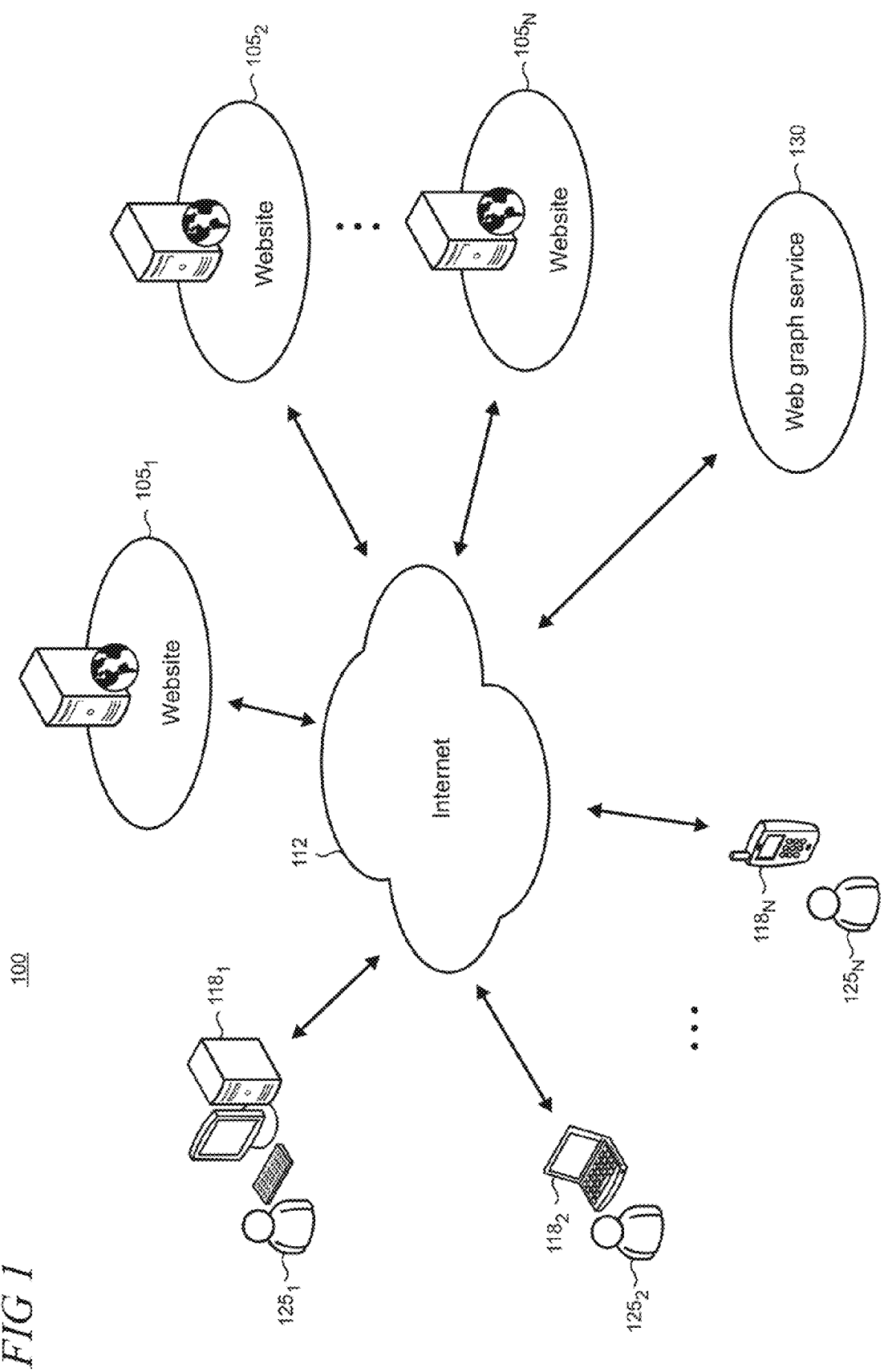
FIG. 1 shows an illustrative networked computing environment in which the present extended web graph algorithms may be utilized.

FIG. 1 shows an illustrative networked computing environment 100 in which the present extended web graph algorithms may be utilized. The environment includes multiple websites $105_{1, 2 \ldots N}$ that are accessible over a network such as the Internet 112 by client computing devices $118_{1, 2 \ldots N}$ that are operated by respective users $125_{1, 2 \ldots N}$. The websites 105 include servers which serve web pages that may be associated with any of a variety of services, applications, resources, etc. Web pages are documents that can contain text, images, audio, video, and/or other multimedia as well as hyperlinks to other pages.

The client computing devices 118 may include any of a variety of platforms such as desktop and laptop PCs (personal computers), workstations, game consoles, as well as devices like smartphones, mobile phones, handheld computers, and the like. A user 125 will typically access a web page through a browser, for example, Microsoft Internet Explorer® or Internet Explorer Mobile, that runs on a client computing device 118.

Figure 2:
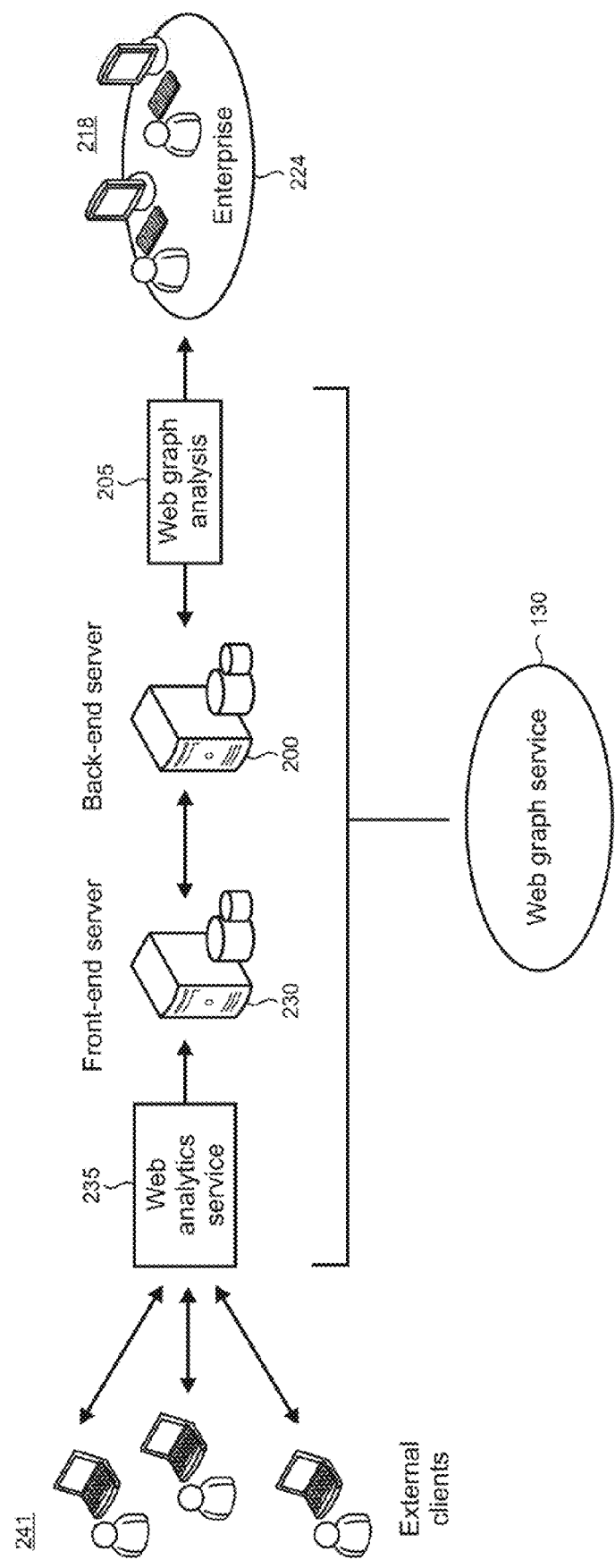
FIG. 2 shows details of an illustrative web graph service.

The networked computing environment 100 also supports a web graph service 130. As shown in FIG. 2, the web graph service 130 illustratively includes one or more computing platforms such as a server 200 that is configured to store compressed web graphs upon which various ones of the present analyses are run. In particular, the servers run software code that, when executed, implement web graph algorithms that have been extended to run directly on virtual node-type compressed web graphs.

The server 200 can be configured as a back-end server (i.e., one that does not have direct connections to the outside world, external processes, services, users, etc.) to expose web graph analysis using the extended algorithms (indicated by reference numeral 205) to users 218 in an enterprise 224 such as a search provider or other entity that engages in usage analysis of the web and/or Internet. In alternative embodiments, the server 200 may be operatively coupled to a front-end server 230 (or be integrated as part of the front-end server) that includes web graph analysis as part of a web analytics service 235 that may be exposed to external clients or entities 241.

Figure 3:
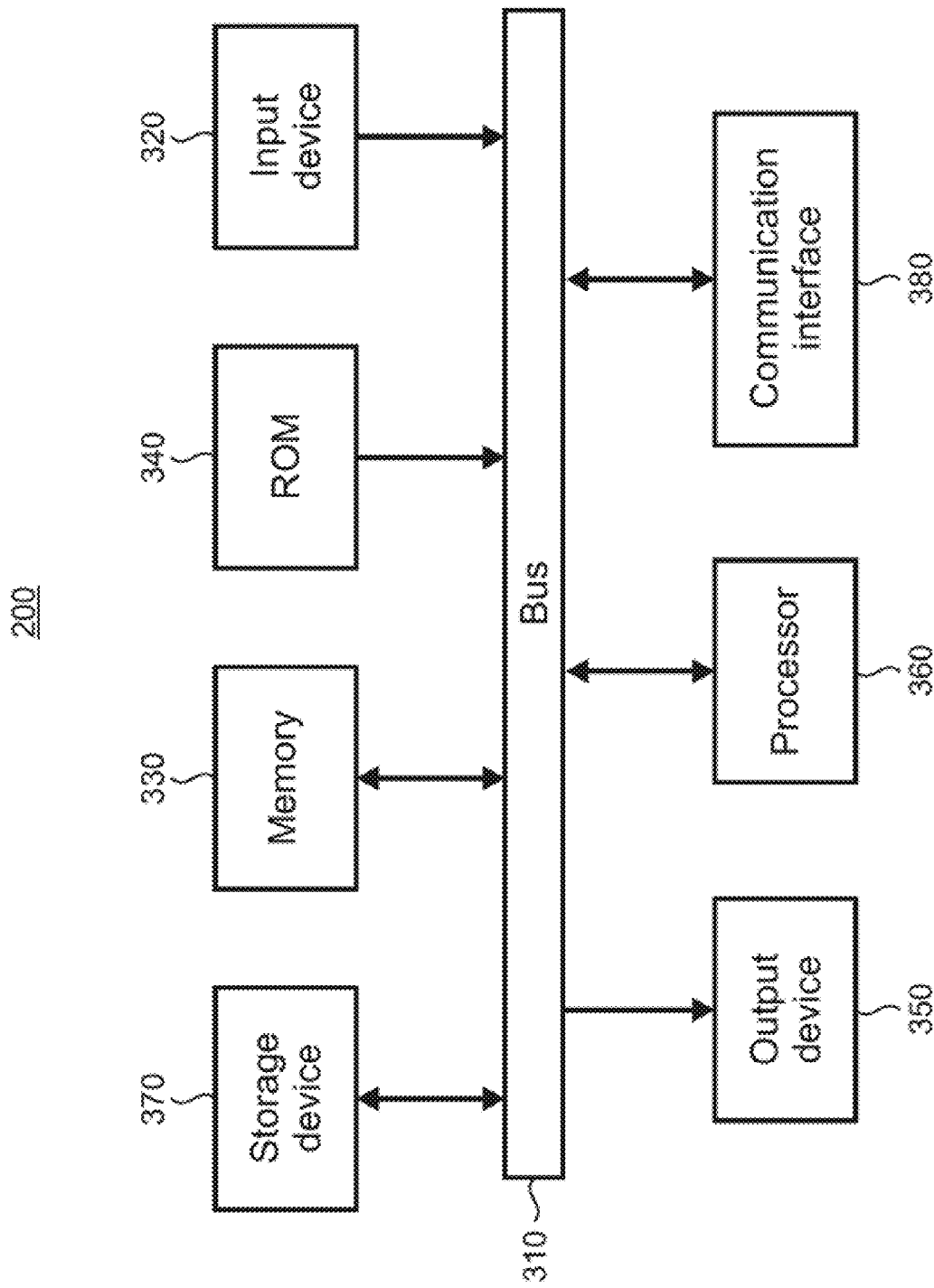
FIG. 3 is a simplified functional block diagram of an illustrative computing platform that is supported by the web graph shown in FIG. 2.

FIG. 3 is a simplified functional block diagram of an illustrative computing platform such as the server 200 (FIG. 2). The server 200 is configured with a variety of components including a bus 310, an input device 320, a memory 330, a read only memory ("ROM") 340, an output device 350, a processor 360, a storage device 370, and a communication interface 380. Bus 310 will typically permit communication among the components of the server 200.

Processor 360 may include at least one conventional processor or microprocessor that interprets and executes instructions. Memory 330 may be a random access memory ("RAM") or another type of dynamic storage device that stores information and instructions for execution by processor 360. Memory 330 may also store temporary variables or other intermediate information used during execution of instructions by processor 360. ROM 340 may include a conventional ROM device or another type of static storage device that stores static information and instructions for processor 360. Storage device 370 may include compact disc ("CD"), digital versatile disc ("DVD"), a magnetic medium, or other type of storage device for storing data and/or instructions for processor 360.

Input device 320 may include a keyboard, a pointing device or other input device. Output device 350 may include one or more conventional mechanisms that output information, including one or more display monitors, or other output devices. Communication interface 380 may include a transceiver for communicating via one or more networks via a wired, wireless, fiber optic, or other connection.

The server 200 may perform such functions in response to processor 360 executing sequences of instructions contained in a tangible machine-readable medium, such as, for example, memory 330, ROM 340, storage device 370, or other medium. Such instructions may be read into memory 330 from another machine-readable medium or from a separate device via communication interface 380.

Figure 4:
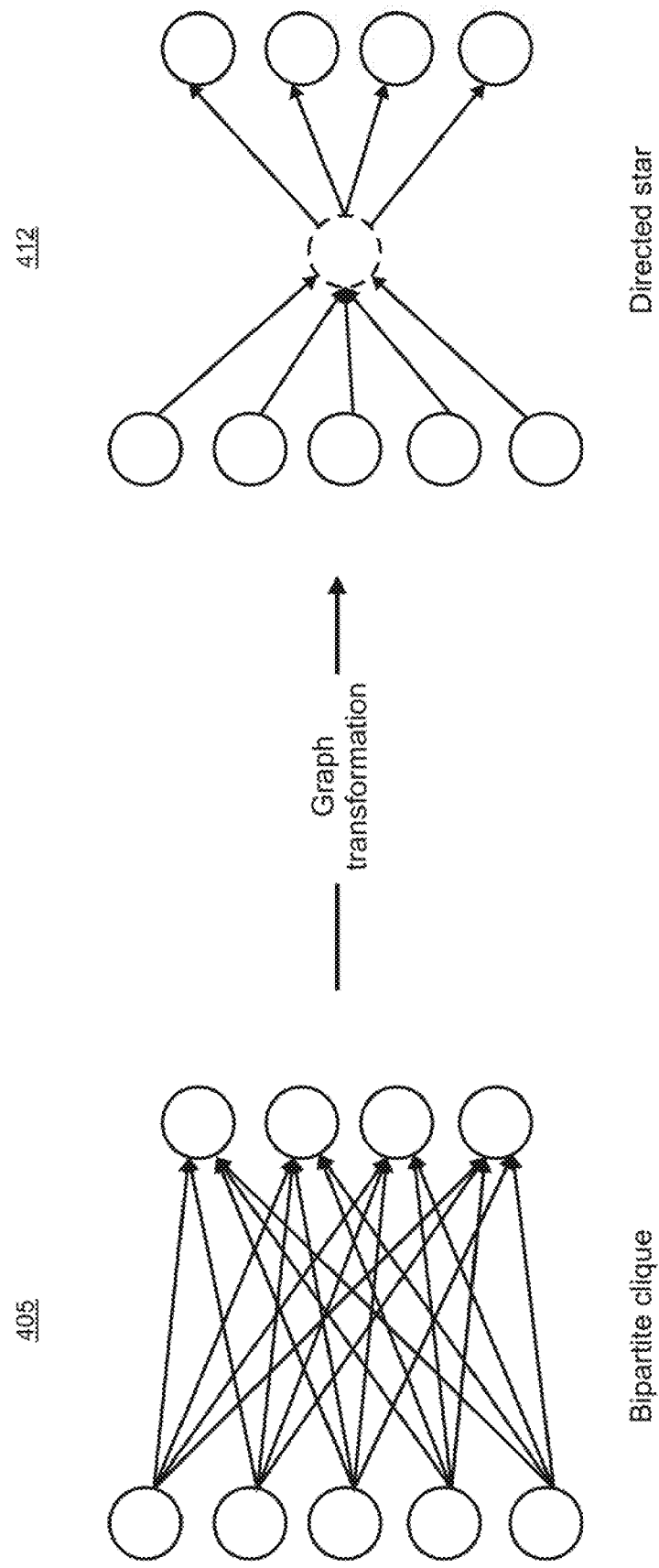
FIG. 4 shows an illustrative web graph before and after the application of a bipartite clique-star transformation.

A description of how virtual node compression is applied to a directed graph G(V, E) is now presented. This technique is based on graph transformation that replaces a directed bipartite clique with a directed star. A directed bipartite clique (or biclique) $(S, T)$ is a pair of disjoint vertex sets S and T such that for each u∈S and v∈T, there is a directed link from u to v in G. Given a biclique $(S, T)$, we form a new compressed graph G'(V', E') by adding a new vertex w to the graph, removing all the edges in $(S, T)$, and adding a new edge uw∈E' for each u∈S and a new edge wv∈E' for each v∈T. This transformation is depicted in FIG. 4. Note that the number of vertices increases by 1, as indicated by reference numeral 405, while the number of edges decreases, since |S|×|T| edges in E are replaced by |S|+|T| edges in E'. It is noted that this is a directed bipartite version of a clique-star transformation that is described by Tomás Feder and Rajeev Motwani. Clique Partitions, Graph Compression and Speeding-Up Algorithms. *J. Comput. Syst. Sci.,* 51(2):261-272, 1995.

The node w is called a virtual node as opposed to the real nodes already present in G. Note that the biclique-star transformation essentially replaces an edge uv in G with a unique path u→w→v in G' that acts as a placeholder for the original edge. Such a path is called a virtual edge.

The biclique-star transformation may be performed again on G'. Virtual nodes are allowed to be reused, so the bipartite clique $(S', T')$ found in G' may contain the virtual node w. In this case, the virtual edge path between u and v in the resulting graph G" is extended to u→w→w'→v. To obtain significant compression, this process is then repeated many times. The graph obtained by this process is called a compression of G.

More generally, given two digraphs G(V, E) and G'(V', E'), then G' can be said to be a compression of G if it can be obtained by applying a series of bipartite clique-star transformations to G. This relationship is noted by G'≼G. Any compression G'≼G satisfies the following properties, which are straightforward to verify and were proved by Gregory Buehrer and Kumar Chellapilla. A scalable pattern mining approach to web graph compression with communities. *WSDM,* pages 95-106, 2008. The following are observed:

There is a one-to-one correspondence between edges in G and the set of edges and virtual edges in G'. In other words, if uv∈E is such that uv ∉ E' then there exists a unique path (called the virtual edge) from u to v in G'.

In the same spirit as above, the graph induced by edges incident to and from virtual nodes in G' is a set of disjoint directed trees.

Let Q be the set of real nodes in G' that are reachable from a real node u by a path consisting internally entirely of virtual nodes. Then Q is exactly the same as the set of out-neighbors of u in G.

The following notation is used for a compressed graph G'. The set of real nodes in G' is denoted by $_rV'$ and the set of virtual nodes is $_vV'$.

Finding Virtual Nodes Using Frequent Itemset Mining

The algorithms described herein can be applied to any compression of G, but their performance depends on the properties of the compression. The most important property is the number of edges and nodes in the compressed graph. The quantity |E|/|E'| is referred to as the compression ratio. In addition, the maximum length of any virtual edge will want to be bounded, which will be called the depth of the compression. Clearly, longer virtual edges are undesirable, the original edge can be accessed only after discovering the entire virtual edge.

Buehrer and Chellapilla introduced an algorithm that produces compressions of web graphs with high compression ratio and small depth. Their algorithm finds collections of bicliques using techniques from frequent itemset mining, and runs in time O(|E|log(|V|)). Their algorithm performs the clique-star transformation in phases. In each phase, multiple (edge-disjoint) bicliques are simultaneously mined and transformed. This heuristic helps reduce the length of virtual edges. Buehrer and Chellapilla report that the resulting compressed graphs contain five to ten times fewer edges than the original, for a variety of page-level web graphs. To obtain this compression typically requires 4 to 5 phases of the algorithm, leading to compressions whose depth is a small constant. Thus, it will be assumed that the above compression scheme is used when referring to compressed web graphs. It will be further assumed that the depth of compression is bounded by a small constant.

It is noted that approximation algorithms for finding the best virtual node compressions were considered by Tomás Feder and Adam Meyerson and Rajeev Motwani and Liadan O'Callaghan and Rina Panigrahy. Representing Graph Metrics with Fewest Edges. *STACS*, pages 355-366, 2003. There, it is shown that finding the optimal compression is NP-hard (i.e., nondeterministic polynomial-time hard), but a good approximation algorithm exists for the restricted problem of finding the best compression obtained from a collection of vertex-disjoint cliques.

Notation

In the following, directed graphs G(V, E) with no loops or parallel edges are considered. The set of in-neighbors and out-neighbors of node v is denoted by $\delta_{in}^G(v)$ and $\delta_{out}^G(v)$ respectively.

The symbol E is overloaded to denote the adjacency matrix of the graph, where:

$$E[u, v] = \begin{cases} 1 & \text{If edge } uv \in E \\ 0 & \text{Otherwise} \end{cases}$$

When talking about probability distributions on the vertices of G, boldfaced letters such as p will denote a column vector of dimension |V|, unless mentioned otherwise. When M is a matrix, M[u] will be used to be the row corresponding to vertex u and M[u, v] to be the entry in row u and column v.

Since random walks on the Markov chain on the underlying graph G are considered, the probability of transition from u to v will be denoted by Pr(u, v). W will denote the random walk matrix obtained by normalizing each row of E to sum up to 1. It is then clear that if $p_0$ is the starting probability distribution, then $p_1 = W^T p_0$ is the distribution resulting from a single step of the uniform random walk on the graph.

Speeding Up Matrix-Vector Multiplication

A large class of graph algorithms can be expressed succinctly and efficiently in terms of multiplication by the adjacency matrix. Here, it is shown that the multiplication of a vector by the adjacency matrix of a graph can be carried out in time proportional to the size of the graph's compressed representation. This matrix multiplication routine can be used as a Black-box to obtain efficient compressed implementations.

Adjacency multiplication is now presented using the proposition:

Let G be a graph with adjacency matrix E, and let G' ≺ G be a compression of G. Then for any vector $x \in \mathbb{R}^{|V|}$, The matrix-vector product $E^T x$ can be computed in time $O(|E'|+|V'|)$.

This computation needs only sequential access to adjacency list of G' and does not require the original graph G.

PROOF. First is an exploration of what the computation $y = E^T x$ looks like when the uncompressed graph G is accessible.

Algorithm 1 is shown below:

---
Algorithm 1 - Multiply(E, x)

for all v ∈ V do
  y[v] = 0
for all Nodes u ∈ V do
  for all Edges uv ∈ E do
    y[v] = y[v] + x[u]

---

Algorithm 1 performs a series of what are popularly called 'push' operations: The value stored at node u in x is 'pushed' along the edge uv. This algorithm simply encodes the following definition of y:

$$y[v] = \sum_{uv \in E} x[u] \qquad (1)$$

This definition is extended to compressed graphs, by extending the vector x onto virtual nodes in the following fashion: For a virtual node v, x[v] may be expanded as:

$$x[v] = \sum_{uv \in E'} x[u] \qquad (2)$$

Armed with the above definition, the equation that computes y using the compressed graph G' is provided:

$$y[v] = \sum_{uv \in E'} x[u] \qquad (3)$$

Definitions 1 and 3 of y are claimed to be equivalent. This follows easily from the property that the subgraph induced by edges incident upon all the virtual nodes is a directed forest. Hence, using the recursive definition 2, the terms corresponding to virtual nodes on the right side of equation 3 can be expanded to obtain exactly equation 1.

Figure 5:
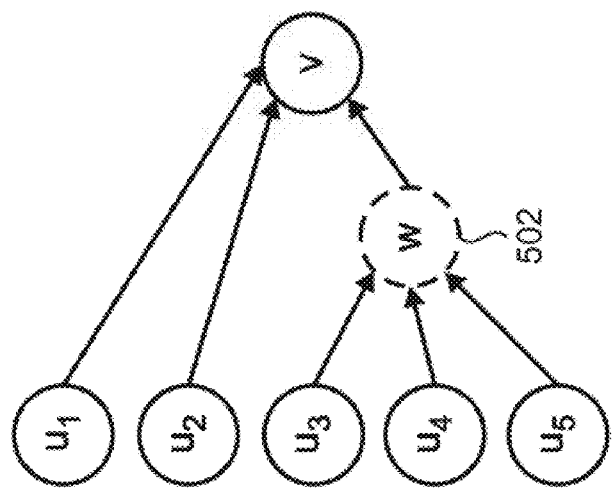
FIG. 5 shows an illustrative push operation on a compressed web graph.
Figure 5:
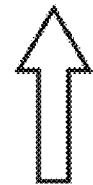
Figure 5:
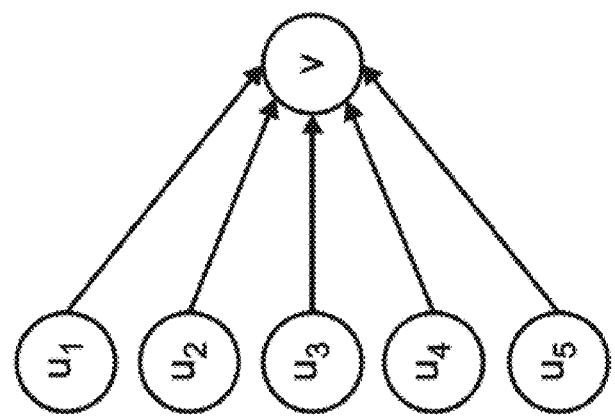

Although equations 1 and 3 are equivalent, their implementation is not. Note that the input vector x is not defined on virtual nodes. Moreover, due to the recursive equation 2, these values have dependencies. For illustration, consider the example in FIG. 5, where w is a virtual node (as indicated by reference numeral 502).

$$y[v] = x[u_1] + x[u_2] + \underline{x[u_3] + x[u_4] + x[u_5]}$$
$$= x[u_1] + x[u_2] + x[w]$$

Hence, although the value of y[u] is encoded correctly by equations 2 and 3, it depends upon x[w], which itself needs to be computed, before the 'push' operation on edge wv is performed. The problem then simply becomes that of arranging the 'push' operations on edges incident upon virtual nodes.

Again, the acyclic structure on these edges provides a solution. Consider a virtual node v all whose in-links originate from real nodes. The acyclic property mentioned above guarantees the existence of such nodes. Clearly, when the push operations on all the out-links of all the real nodes are finished, x[v] has been computed. Now, the scores may be 'pushed' along all the out-links of v, which may in turn help complete the computation of x[w] for some other virtual node w.

The abstract idea is now formalized. Assign a rank R(v) to each virtual node v using following recursive definition.

If u is real for all uv∈E' then R(v)=0.
Else, $$R(v) = 1 + \max_{u \in \delta_{in}(v) \cap V} R(u)$$

The rows of the adjacency list representation of G' are now reordered in the following manner:
1. Adjacency lists of real nodes appear before those of virtual nodes.
2. For two virtual nodes u and v, if R(u)<R(v) then the adjacency list of u appears before that of v.

This reordering now imparts the following property to the adjacency list of G': For every virtual node v and any u such that uv∈E', the adjacency list of u appears before that of v. Therefore x[v] can be computed before beginning to push scores along out-links of v. This ensures the correctness of algorithm 2 (shown below) for computing y using the reordered representation of G'.

---
Algorithm 2 Compressed-Multiply(E, x)
---
for all real nodes v do
   y[v] = 0
for all virtual nodes v do
   x[v] = 0
for all Nodes u ∈ V' do
   for all Edges uv ∈ E' do
     if v is real then
       y[v] = y[v] + x[u]
     else
       x[v] = x[v] + x[u]
---

Finally, note that the reordering can be performed during preprocessing by computing the ranking function R using a simple algorithm that requires O(|E'|+|V'|) time.

Note that we can also speed up the computation of z=Ex in a similar manner, by compressing the in-link graph rather than the out-link graph. The same collection of virtual nodes can be used for both the in-link graph and the out-link graph, leading to compressed in-link and out-link graphs with the same values of |V'| and |E'|. However, the in-links of virtual nodes in the compressed graph must be stored separately and require a different ordering of virtual nodes.

Next are described a few examples of algorithms that can be written in terms of adjacency matrix multiplication, and thus can be sped up using Compressed-Multiply as a subroutine. Many of these algorithms perform several iterations, and each iteration is dominated by the time required to compute the matrix-vector product.

Random walk distributions: The task is to compute the distribution of a random walk after T steps, starting from the initial distribution $p_0$. This can be done in T iterations by computing $p_{t+1} = E^T D^{-1} p_t$, where D is the diagonal matrix such that D(i, i) is the outdegree of vertex i. Given $p_t$, we first compute $D^{-1} p_t$ in time O(|V|), and then use Compressed-Multiply to compute $p_{t+1} = E^T(D^{-1} p_t)$. The time per iteration is O(|V|)+O(|E'|+|V'|)=O(|E'|+|V'|).

Eigenvectors and spectral methods: The largest eigenvectors of the adjacency matrix E can be computed using the power iteration method, which requires repeatedly multiplying by the adjacency matrix E. In each iteration the projections onto the larger eigenvectors are subtracted out and then normalized, which can be done in O(|V|) time per iteration, so the time required per iteration is O(|E'|+|V'|). The power method can also be used to compute the few smallest eigenvectors of the Laplacian matrix L=D−E, which are useful for spectral partitioning (see Fan R. K. Chung. *Spectral Graph Theory*.) and transductive learning on graphs (see Dengyong Zhou and Christopher J. C. Burges and Tao Tao. Transductive link spam detection. *AIRWeb '07: Proceedings of the 3rd international workshop on Adversarial information retrieval on the web*, pages 21-28, New York, N.Y., USA, 2007. ACM).

Top singular vectors: The top singular vectors of E, which are the top eigenvectors of $E^T E$ and $EE^T$, can also be computed using the power method. A single iteration requires first multiplying by $E^T$ using the compressed outlink graph and then multiplying by E using the compressed in-link graph. Since the compressed in-link graph and out-link graph have the same values of |E| and |V|, the time per iteration is O(|E'|+|V'|).

As an application, Kannan and Vinay introduced an algorithm for finding dense subgraphs of directed graphs, whose main step of the algorithm is computing the top singular vectors of E (see R. Kannan and V. Vinay. Analyzing the structure of large graphs. Manuscript, 1999).

Estimating the size of neighborhoods: Becchetti et al. introduced an algorithm for estimating the number of nodes within r steps of each node in a graph, based on probabilistic counting (see Luca Becchetti, Carlos Castillo, Debora Donato, Stefano Leonardi, and Ricardo Baeza-Yates. Using rank propagation and probabilistic counting for link-based spam detection. *Proceedings of the Workshop on Web Mining and Web Usage Analysis (WebKDD)*, Pennsylvania, USA, 2006. ACM Press). Each node stores a k-bit vector initialized to all zeros. Initially, some randomly chosen bit positions are flipped to ones. The algorithm then performs r iterations, and in each iteration each node's bit vector becomes the bitwise-or of its own bit vector and the bit vectors of its neighbors. This iteration can be viewed as multiplication by the adjacency matrix, where the sum operation is replaced by bitwise-or.

The approaches described above can be used to speed up the canonical link analysis algorithms including PageRank (see Sergey Brin and Lawrence Page. The anatomy of a large-scale hypertextual Web search engine. *Computer Networks and ISDN Systems*, 30(1-7):107-117, 1998; Lawrence Page, Sergey Brin, and Rajeev Motwani and Terry Winograd. The PageRank citation ranking: Bringing order to the web. Technical report, Stanford Digital Library Technologies Project, 1998); HITS (see Jon M. Kleinberg. Authoritative sources in a hyperlinked environment. *Journal of the ACM*, 46(5):604-632, 1999), and SALSA (see R. Lempel and S. Moran. The stochastic approach for link-structure analysis (SALSA) and the TKC effect. *Computer Networks* (Amsterdam, Netherlands: 1999), 2000). Implementations of these algorithms are described below using Black-box compressed multiplication.

The algorithms essentially perform several iterations of the power method for different graph-related matrices. Each iteration requires $\Theta(|E|+|V|)$ operations on an uncompressed graph G. Given a compressed graph G', each iteration can be sped up to $\Theta(|E'|+|V'|)$ operations using Compressed-Multiply. Typically $|V'|$ is 20 to 40% larger than $|V|$, so the performance boost observed is determined mainly by the ratio $$\frac{|E'|}{|E|}.$$

Alternative compress$^{ed}$ implementations of these algorithms will be described in more detail below.

PageRank: Given a graph G with adjacency matrix E, PageRank can be computed by the following power method step:

$$x_{i+1} = (1-\alpha)E^T(D^{-1}x_i) + \alpha j$$

where $\alpha$ is the jump probability and j is the jump vector.

HITS and SALSA: The HITS algorithm assigns a separate hub score and authority score to each web page in a query-dependent graph, equal to the top eigenvector of $EE^T$ and $E^TE$. SALSA can be viewed as a normalized version of HITS, where the authority vector a and hub vector h are the top eigenvectors of $W_r^T W_c$ and $W_c W_r^T$, where $W_r$ and $W_c$ are the row and column normalized versions of E.

Stochastic Algorithms on Compressed Web Graphs

In this section, an alternative method for computing the stationary vectors for PageRank and SALSA using compressed graphs is considered. We show that the stationary vector in the original graph can be computed by computing the stationary vector of a Markov chain running on the compressed graph, then projecting and rescaling. This allows computation of PageRank or SALSA on the original web graph by running an existing implementation of the algorithm directly on the compressed graph.

PageRank models a uniform random walk on the web-graph performed by the so called "random surfer." The matrix W as defined above formulates the underlying Markov chain. To ensure a unique steady state exists for this random walk we need W to be irreducible and aperiodic. These conditions may not be satisfied by the graph G. Indeed, roughly only a quarter of WWW graph is strongly connected. To address this technicality, and also to better model the behavior of the random web surfer, it is assumed that the surfer only clicks on a random link on a page with probability $1-\alpha$, $0<\alpha<1$. With probability $\alpha$, the surfer jumps to any page in the graph, which she then chooses from the probability distribution j. Here j is a vector of positive entries called the jump vector. This modification makes the Markov chain ergodic, and hence, the equation governing the steady state becomes:

$$p = ((1-\alpha)W^T + \alpha J)p = L^T p$$

where J is simply the square matrix containing a copy of j in each column.

The power method can be efficiently applied to compute the steady state of this Markov chain in $\Theta(r(|E|+|V|))$ operations given an adjacency list representation of E, by multiplying the current distribution vector $p_i$ by $(1-\alpha)W^T$ and then adding the vector $\alpha j$ to it.

A goal then is to run an algorithm similar to the above on a compressed G'⊰G such that, just restricted to nodes in V, it models the jump-adjusted uniform random walk on G. As above, if uv∈G then starting from u, the walk can reach exactly the set $\delta_{out}^G(u)$ using a path consisting internally of virtual nodes. Let $p_{uv}$ be the probability that v is the first real node visited by the random walk on G' when starting from u. If the transition probabilities on G' are tweaked so as to have $p_{uv}$ equal to the probability of u→v transition in G, then a good model of the original uniform random walk on G is obtained.

With this in mind, some required notation is now defined. For a graph G (compressed or otherwise), $\Delta_G(u)$ is defined as follows:

$$\Delta_G(u) = \begin{cases} 1 & \text{If } u \text{ is real} \\ \sum_{w \in \delta_{out}^G(u)} \Delta_G(w) & \text{If } u \text{ is virtual} \end{cases}$$

The above recursive definition simply expresses the following: $\Delta_G(u)$ is the number of real nodes reachable from u by virtual edges not starting at u. This follows from the property that the subgraph induced by edges incident to and from virtual nodes forms a tree-structure. For example, in graph $G_2$ in FIG. 6 (as indicated by reference numeral 605), we have $\Delta_{G_2}(v)=5$ even though $|\delta_{out}^{G_2}(v)|=3$, because following 5 virtual edges leading to real nodes $x_1, \ldots, x_5$ pass through v.

1. u→v→w→$x_1$
2. u→v→w→$x_2$
3. u→v→w→$x_3$
4. u→v→$x_4$
5. u→v→$x_5$

This configuration can be formed from the original graph $G_0$, when a bipartite clique involving u and $x_1, \ldots, x_3$ is replaced by virtual node w and subsequently, a bipartite clique involving u and w, $x_4, x_5$ was replaced by virtual node v.

The function $\Delta_G$ is important in our effort to run computations on the compressed graph without effectively decompressing it. Although computing $\Delta_G$ given the compressed graph essentially requires us to decompress the graph, we will assume that the values of this function are supplied to us along with the compressed graph. Indeed, the value $\Delta_G(v)$ is readily available to the compressor algorithm (see Buehrer) when it introduces the virtual node v, and hence it only needs to record this entry associated with node v. This increases the storage requirement for the compressed graph, but not more than by a factor of 2, which itself is a generous, worst-case estimate since the proportion of virtual nodes is very small. In practice, the extra storage required is close to 3 to 5% (Buehrer). Given the function $\Delta_G(u)$, we define the real out-degree of u in G:

$$\Gamma_G(u) = \sum_{w \in \delta_{out}^G(u)} \Delta_G(w)$$

For a real node u, $\Gamma_G(u)$ is nothing but the number of real nodes in G reachable from u using one virtual edge. For a virtual node v, $\Gamma_G(v) = \Delta_G(v)$.

It is easy to verify that if G'⊰G, then for a node u∈G, $\Gamma_{G'}(u) = \Gamma_G(u)$. Moreover, if G is an uncompressed graph then $\Gamma_G(u) = |\delta_{out}^G(u)|$.

Figure 6:
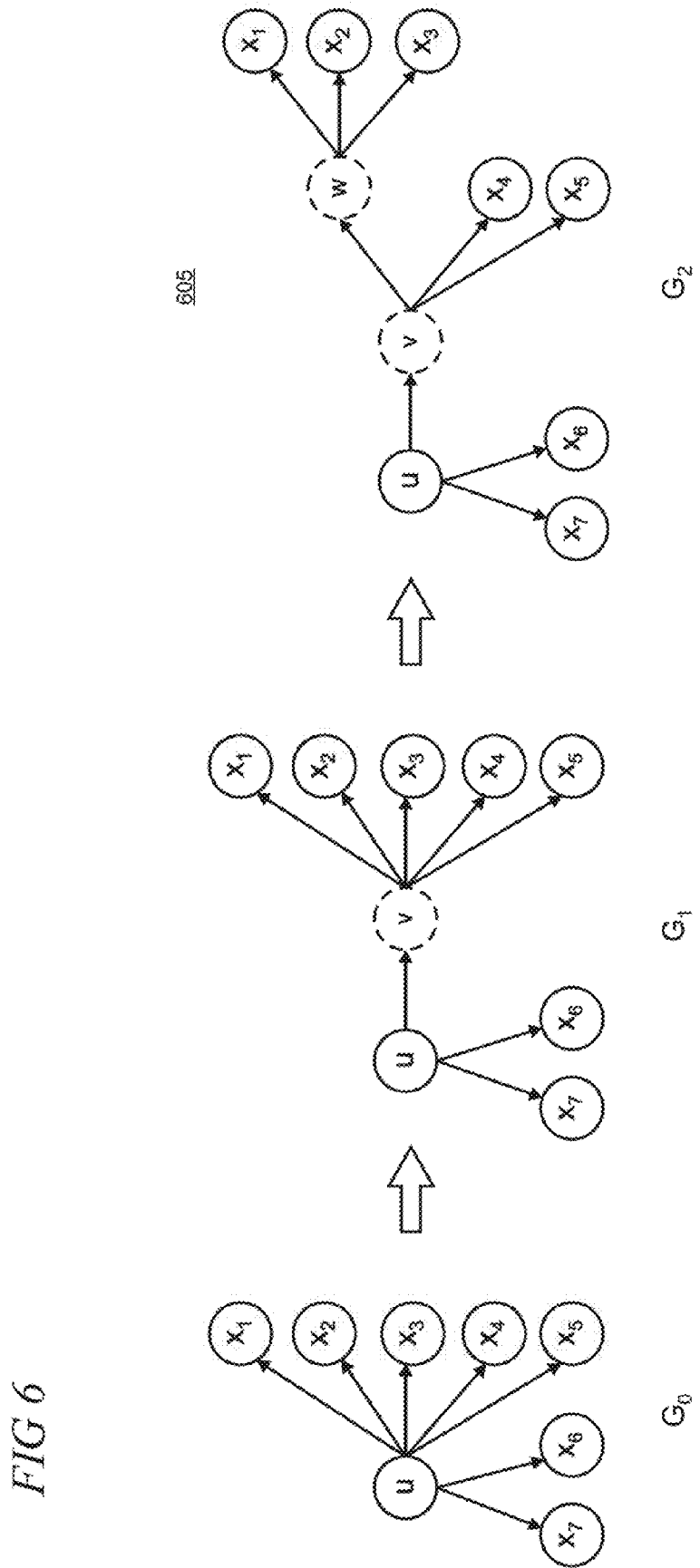
FIG. 6 shows the application of an illustrative $\Delta$ function to a graph.

How are the functions $\Delta_G$ and $\Gamma_G$ relevant? Consider the edge uv in graph $G_2$ in FIG. 6. $\Delta_{G_2}(v)=5$ and $\Gamma_{G_2}(u)=7$. Hence, virtual edges passing through the virtual node v capture or encode 5 real out-neighbors of u in the original graph G. Common sense tells us that to accurately model the uniform random walk on G, probability of the transition u→v must be 5/7.

With this background, a random walk on a graph G' compressed from G that exhibits the desired modeling behavior can be defined:

1. The random walk on G' is not uniform (unlike the one on G). For example, for the compressed graph $G_2$ (indicated by reference numeral 605 in FIG. 6), it is ensured that $Pr(u, v)=5 \cdot Pr(u, x_6)$ since v captures the virtual edges to 5 real neighbors of u. Similarly, $Pr(v, w)=3 Pr(v, x_4)$ is kept.

2. The jump vector is ensured to have zeros in entries corresponding to virtual nodes. Similarly, transitions made from virtual nodes have zero jump probability. This ensures that the Markov chain models exactly the uniform random walk on G.

Given graphs $G' \prec G$, jump probability $\alpha$ and the jump vector j, the random walk on G' is defined as follows:

Let X be the matrix of dimension $|V'| \times |V'|$ such that:

$$X[u, v] = \frac{\Delta_{G'}(v)}{\Gamma_{G'}(u)}$$

Y is obtained from X by making adjustments for the jump probability:

$$Y[u, v] = \begin{cases} (1-\alpha)X[u,v] & \text{If } u \text{ is real} \\ X[v, u] & \text{If } u \text{ is virtual} \end{cases}$$

Pad the jump vector j with zeroes to obtain a jump vector j' for G'. This assigns a probability of a jump transition into a virtual node to be zero. Let J' be the jump matrix containing copies of j' in each column.

The desired Markov chain is given by the transition matrix $MC(G')=Z=(Y+\alpha J'^T)$.

Although the Markov chain above was defined for a compressed graph G', one can easily verify that MC(G) for an uncompressed graph is simply the jump-adjusted uniform random walk. This is not surprising, since we designed MC(G') to model the uniform random walk on G.

Just like MC(G), the irreducibility and aperiodicity of MC(G') is ensured by the jump vector j'. It makes the set of real nodes strongly connected, and since every virtual node has a path to and from a real node, the resulting Markov chain is ergodic. Hence it makes sense to talk about the steady state of MC(G').

Algorithm 3 is shown below:

---
Algorithm 3 - ComputePageRank(G, G', $\alpha$, j)

Compute Z = MC(G').
Compute the steady state of the Markov chain represented by Z. That is, compute p' such that
  p' = $Z^T$p'
using power-iterations.
Project p' onto p'', the set of real nodes. Discard the values for virtual nodes. Scale p'' up to unit $L_1$ norm to obtain p which is the desired vector of PageRank values on G.

---

Algorithm 3 accepts a graph G, it's compressed representation G', jump probability $\alpha$ and the jump vector j to compute PageRank on vertices of G strictly using the graph G'.

From the schematic, it is clear that algorithm 3 can be implemented to run in time $\Theta(r(|E'|+|V'|))$. The correctness of the algorithm is proven in Theorem 1 below:

Theorem 1 Vector p computed by algorithm 3 satisfies $$p=((1-\alpha)W^T+\alpha J)p$$

That is, p is the steady state of the jump-adjusted uniform random walk MC(G).

PROOF. Although algorithm 3 is not recursive, the proof will be. The recursion will be based on the phases of compression described above.

Let $G_i(V_i, E_i)$ for $0 \leq i \leq k$ be a series of graphs:

$$G'=G_k \prec G_{k-1} \prec \ldots \prec G_1 \prec G_0=G$$

such that $G_{i+1}$ is obtained from $G_i$ by one phase of the clique-star transformations, (i.e., by replacing many edge-disjoint bipartite cliques by virtual nodes). The following property follows from the procedure: For $uv \in E_i$, if $uv \notin E_{i+1}$ then there exists the unique virtual edge $u \to w \to v$ in $G_{i+1}$. This bound helps the expansion of the equations governing the steady state of $MC(G_{i+1})$.

Let $j_i$ be the padded jump vector associated with $MC(G_i)$. Let $p_i$ be the steady state of $MC(G_i)$. The following claim is crucial to the proof:

Claim 2 For all $0 \leq i < k$ and $u \in V_i$, $p_{i+1}[u]=\beta_i p_i[u]$, where $\beta_i$ is a constant depending only upon i.

Refer to the Appendix for the proof of this claim. Telescoping the statement of Claim 2 above, there is a constant $\beta$ such that for all $u \in V_0$, $p'[u]=p_k[u]=\beta p_0[u]$. Hence p as computed by algorithm 3 satisfies $$p=((1-\alpha)W^T+\alpha J)p$$

The scaling ensures that p has unit $L_1$ norm, and hence is the desired PageRank vector.

Although Theorem 1 completes the theoretical analysis of our method, one can begin to see a practical difficulty in the implementation of algorithm 3. If the value of the constant $\beta$ is very small, the computed values of p' will contain very few bits of accuracy, and the subsequent scaling up will only maintain this precision. In what follows, we prove a lower bound on $\beta$.

Theorem 3 Let $$G'=G_k \prec G_{k-1} \prec \ldots \prec G_1 \prec G_0=G$$

be any sequence of graphs as in the proof of theorem 1. Let $\beta$ be the scaling factor between p' and p in algorithm 3. Then $\beta \geq 2^{-k}$.

PROOF. Using definitions from the proof of theorem 1, let $\beta_i$ be the scaling factor between $p_i$ and $p_{i+1}$. Then we'll prove that $$\beta_i \geq \frac{1}{2}.$$

Telescoping this bound will prove the theorem. Recall that any node $v \in V_{i+1}-V_i$ is a freshly added virtual node. Hence, only contributions to $p_{i+1}[v]$ come from nodes in $V_i$. Moreover, any node u can contribute at most $p_{i+1}[u]$ to the steady state values of other nodes. Therefore, $$\sum_{v \in V_{i+1}-V_i} p_{i+1}[v] \leq \sum_{u \in V_i} p_{i+1}[u] = \sum_{u \in V_i} \beta_i p_i[u] = \beta_i$$

since $\sum_{u \in V_i} p_i[u]=1$. Adding $\sum_{u \in V_i} p_{i+1}[u]=\beta_i$ to the above equation, we have:

$$\sum_{v \in V_{i+1}-V_i} p_{i+1}[v] + \sum_{u \in V_i} p_{i+1}[u] = \sum_{v \in V_{i+1}} p_{i+1}[v] = 1 \leq 2\beta_i$$

Hence, $\beta \geq 2^{-k}$.

Theorem 3 helps by noting that it holds for any valid sequence of transformations. The sequence of graphs $G_i$'s, can then be used such that $G_i$ is the graph after i phases of edge-disjoint clique-star transformations as described in Buehrer. Since only 4-5 phases are required in practice to obtain nearly the best possible compression, the above theorem then concludes that only 4-5 bits of floating point accuracy are lost when using algorithm 3.

The above schematic can readily be adapted to other variants of PageRank. For example, if the edges in the starting graph carry weights as opposed to being unweighted, algorithm 3 can run on the corresponding compressed graph with minimal effort. In fact, the only definition that needs to be changed is that of $\Delta_G(u, v)$, wherein we assign $\Delta_G(u, v) = w(u, v)$ when $v$ is a real out-neighbor of $u$.

Turning now to an implementation of a SALSA algorithm that may run directly on a compressed web graph, it is observed that SALSA is a link analysis algorithm similar to HITS that assigns each webpage a separate authority score and hub score. Let $G(V, E)$ be the query-specific graph under consideration, with $W_r$ and $W_c$ being the row and column normalized versions of E respectively. Then the authority vector $a$ and hub vector $h$ are the top eigenvectors of $W_r^T W_c$ and $W_c W_r^T$ respectively, satisfying the following recursive definition:

$$a = W_r^T h \quad h = W_c a \qquad (4)$$

We can view the above as the following single eigenvalue computation:

$$\begin{bmatrix} a' \\ h' \end{bmatrix} = M \begin{bmatrix} a' \\ h' \end{bmatrix}$$

where M is the $2|V| \times 2|V|$ matrix encoding equation 4.

Under reasonable assumptions that are described by Lempel, the solutions $a$ and $h$ to the above system are unique and with non-negative entries. Like with PageRank, power-iterations can be employed to compute these eigenvalues.

A method is now provided to run the algorithm directly on a compressed graph G' to compute authority and hub scores on the original graph G. As expected, we will start with the function $\Delta_G$. However, since SALSA involves pushing authority scores back over in-links to a node, the in-link counterpart of $\Delta_G$ is also needed. This function, $\Lambda_G$ is defined in a manner analogous to $\Delta_G$:

$$\Lambda_G(u) = \begin{cases} 1 & \text{If } u \text{ is real} \\ \sum_{w \in \delta_{in}^G(u)} & \text{If } u \text{ is virtual} \end{cases}$$

As noted in the case of $\Delta_G$, the values of $\Lambda_G$ can be registered during the operation of the compression algorithm. Similarly, we define the in-degree analogue of $\Gamma_G$ as:

$$\Phi_G(u) = \sum_{w \in \delta_{in}^G(u)} \Lambda_G(w)$$

As may be expected in parallel to the scheme for PageRank, a modeling Markov chain can be designed on the compressed graph G' by assigning the probability of forward transition along the edge $uv \in E'$ to be $$\frac{\Delta_{G'}(v)}{\Gamma_{G'}(u)}$$

and that of reverse transition to be $$\frac{\Lambda_{G'}(u)}{\Phi_{G'}(v)}.$$

This is indeed the case, however, since two different scores in case of SALSA are dealt with, subtle issues are encountered even after these adjustments.

To understand the subtleties involved, the directed graphs may be viewed as flow networks. Consider an edge $uv \in E$ in graph G and the corresponding virtual edge $u \to w \to v$ in the compressed graph G'. In case of PageRank, only one commodity—the PageRank score—flows through the network. Hence the virtual nodes in compressed graphs merely delay the flow of PageRank between real nodes. For example, p'[u] contributes to p'[w] which in turn contributes to p'[v] as desired. In case of SALSA, the situation is different.

In the original graph G, the hub score from node u is pushed along a forward edge ($uv \in E$) into the authority score bucket of node v, whereas authority score of node v is pushed along the reverse edge into the hub score of node u.

If SALSA power iterations are attempted to be run (albeit with weight adjustments as noted above) unchanged on G', h'[u] would contribute to a'[w] but never to a'[v]. This clearly is erroneous modeling of the flow of scores in the original graph, and it stems from the alternating behavior of authority and hub scores.

To address this issue, the abstract idea is drawn upon that virtual nodes merely "delay" the flow of scores within the network and hence must not participate in the alternating behavior. (Recall that in the case of PageRank, virtual nodes are barred from jump transitions). Specifically, for a virtual edge $u \to w \to v$, the hub score h'[u] is pushed into hub score h'(v), which subsequently will contribute to a'[v] as desired. Indeed, this modification to the definitions addresses the issue as formulated in the equations below:

SALSA on uncompressed graph:

$$a_{i+1}[u] = \sum_{v \in \delta_{in}^G(u)} \frac{1}{|\delta_{out}^G(v)|} h_i(v)$$

$$h_{i+1}[u] = \sum_{v \in \delta_{out}^G(u)} \frac{1}{|\delta_{in}^G(v)|} a_i(v)$$

SALSA on compressed graph:

$$a'_{i+1}[u] = \begin{cases} \sum_{v \in \delta_{in}^{G'}(u)} \frac{\Delta_{G'}(u)}{\Gamma_{G'}(v)} h'_i(v) & \text{If } u \text{ is real} \\ \sum_{v \in \delta_{out}^{G'}(u)} \frac{\Lambda_{G'}(u)}{\Phi_{G'}(v)} a'_i(v) & \text{If } u \text{ is virtual} \end{cases}$$

$$h'_{i+1}[u] = \begin{cases} \sum_{v \in \delta_{out}^{G'}(u)} \frac{\Delta_{G'}(u)}{\Gamma_{G'}(v)} a'_i(v) & \text{If } u \text{ is real} \\ \sum_{v \in \delta_{in}^{G'}(u)} \frac{\Delta_{G'}(u)}{\Gamma_{G'}(v)} h'_i(v) & \text{If } u \text{ is virtual} \end{cases}$$

As a sanity check, observe that the above described modifications do not alter the operation of SALSA on uncompressed graphs, they simply extend it.

It is a matter of detail now to arrange the above equations into a matrix computation form and to implement power-iterations to compute eigenvalues a' and h'. For ease of exposition, this may be viewed as computing the eigenvector $$\begin{bmatrix} a' \\ h' \end{bmatrix}$$

of the $2|V'| \times 2|V'|$ matrix that encodes above equations. This matrix can be called M'.

Unlike PageRank, the irreducibility and aperiodicity of this Markov chain is not immediately obvious. Aperiodicity can be obtained by introducing a non-zero probability $\alpha$ of non-transition on real nodes, i.e. modifying the equations to:

$$a'_{i+1}[u] = \alpha a'_i[u] + (1-\alpha) \sum_{v \in \delta^{G'}_{in}(u)} \frac{\Delta_{G'}(u)}{\Gamma_{G'}(v)} h'_i(v)$$

$$h'_{i+1}[u] = \alpha h'_i[u] + (1-\alpha) \sum_{v \in \delta^{G'}_{out}(u)} \frac{\Delta_{G'}(u)}{\Phi_{G'}(v)} a'_i(v)$$

Irreducibility of M' follows from that of M. This idea is outlined as follows. Consider the support graph $G_M$ of matrix M. This graph on $2|V|$ vertices is identical to the graph G' constructed by Lempel and it follows that it is bipartite. However, since M contains each edge $uv \in E$ in both directions, with the connectivity assumptions on stated by Lempel, $G_M$ has a single strongly connected component. Now the irreducibility of M' follows from that of M by the observation that every path between real nodes is kept intact during the compression and that every virtual node has a path to and from a real node.

The following theorem proving the correctness of the solution has proofs almost identical to that of the theorems above and are omitted here.

Theorem 4 Let $$\begin{bmatrix} a' \\ h' \end{bmatrix} \text{ and } \begin{bmatrix} a \\ h \end{bmatrix}$$

be top eigenvectors of M' and M respectively. Then:
1. $a'[u] = \beta a[u]$ and $h'[u] = \beta h[u]$ for all $u \in V(G)$
2. If k is the length of the longest virtual edge in G', then $\beta \geq 2^{-k}$.

The advantages and disadvantages of computing PageRank and SALSA with the Black-box multiplication algorithms and the Markov chain algorithms are now presented.

Although the Markov chain algorithms converge to eigenvectors that are similar to the corresponding eigenvectors on the uncompressed graph, the number of iterations required may change. Since the compression via virtual nodes introduces longer paths in the graph, it may require a larger number of power-iterations to converge to the desired accuracy. It is noted that the number of iterations required may increase by at most a factor of the longest virtual edge.

The Black-box methods simply speed up each individual iteration, so the number of iterations required is identical to the uncompressed graphs. As a result, the Black-box methods usually result in better speed-up ratios. The number of iterations required by the Markov chain algorithm and the overall comparison in speed-up ratios is examined experimentally below.

Since the Markov chain methods only involve changing transition probabilities, an existing implementation of say PageRank can be run directly on the compressed graph, with appropriately modified weights, to compute PageRank in the original uncompressed graph. This allows us to take advantage of existing optimized implementations and heuristics.

Both methods can be efficiently parallelized. Black-box multiplication requires that certain sets of virtual nodes be pushed before others, requiring a small number of global synchronizations in each iteration. For the Markov chain method, any parallel algorithm for computing PageRank or SALSA can be used, some of which require few if any global synchronizations (see Frank McSherry. A uniform approach to accelerated PageRank computation. *WWW*, pages 575-582, 2005, and David Kempe and Frank McSherry. A decentralized algorithm for spectral analysis. *J. Comput. Syst. Sci.*, 74(1):70-83, 2008). In a large-scale parallel implementation, the cost of global syncs can be prohibitive, so in this case the Markov chain method may be preferable. It is noted that the Markov chain methods are not directly applicable to HITS because the scaling step involved after every iteration destroys correctness. Finally, the Black-box method for SALSA needs lists of in-links of virtual nodes and separate orderings on virtual nodes with regard to in-links and out-links. This adds to the storage required for the compressed graph, apart from slowing the algorithm down to a small extent.

Many algorithms can be sped up using compressed graphs, but require techniques different than the ones we have described here. Several examples were considered by Feder, including algorithms for computing breadth-first search and other shortest path algorithms.

One simple but useful extension of our results is multiplying a sparse vector by the adjacency matrix. Given a sparse vector x where S is the set of vertices that with nonzero entries in x, we can compute E·x using the matrix-vector multiplication method from above, except we only need to push from real nodes with nonzero values, and through the virtual edges incident on those nodes. This requires time proportional to L*outdegree(S), where L is an upper bound on the length of a virtual edge. Similarly, we can compute $A^T x$ in time proportional to L*indegree(S). These operations requires random access to the adjacency information of the compressed graph, as opposed to the algorithms in earlier sections that require only sequential disk access to the compressed graph. Using sparse vector multiplication, we can implement algorithms that examining only a portion of the entire graph, including algorithms for local clustering and community finding (see Reid Andersen and Kevin J. Lang. Communities from seed sets. *WWW*, pages 223-232, 2006) and the computation of personalized PageRank (see Taher H. Haveliwala. Topic-sensitive PageRank: A context-sensitive ranking algorithm for web search. *IEEE Trans. Knowl. Data Eng.*, 15(4): 784-796, 2003; and Glen Jeh and Jennifer Widom. Scaling personalized web search. *Proceedings of the 12th World Wide Web Conference (WWW)*, pages 271-279, 2003).

Experiments

The Black-box multiplication and Markov chain methods for algorithms PageRank and SALSA were implemented on web-graphs compressed using techniques described by Buehrer. These extended versions were compared against standard versions of PageRank and SALSA running on uncompressed graphs. This is a fair comparison, since the extended algorithms do not have any advantage over the standard versions other than their use of the compressed graphs.

System: The algorithms were run on a standard workstation with 16 GB RAM and a quad-core Intel Xeon processor at 3.0 GHz. Only one of the available cores was used, as the implementation is single-threaded. This does not limit the generality of the performance boost, since as discussed above, the Markov chain methods are highly parallelizable and the Black-box multiplication methods require only a small amount of synchronization between threads.

Implementation: The programs utilized strictly followed the sequential file access paradigm, wherein the graph files are stored only on disk in the adjacency list format. O(|V|) bits of random access memory were used to hold the intermediate score vectors.

Datasets: The public datasets eu-2005 and uk-2005 hosted by *Laboratory for Web Algorithmics at Universita Degli Studi Di Milano* were utilized. Many of these web graphs were generated using *UbiCrawler* (see Paolo Boldi, Bruno Codenotti, Massimo Santini, and Sebastiano Vigna. UbiCrawler: A scalable fully distributed web crawler. *Software: Practice & Experience*, 34(8):711-726, 2004) by various labs in the search community. Statistics for these two datasets appear in the table 700 shown in FIG. 7.

The comparative performance of PageRank algorithms is tabulated in the tables 800 and 900 respectively shown in FIGS. 8 and 9. Note that the speed-up ratios consider the total time required, as opposed to the time per iteration, since the number of iterations differs.

Both the Black-box and Markov chain methods show an improvement in the time per iteration over the uncompressed versions of the algorithms. However, as described above, the Markov chain method requires more iterations to converge to the same accuracy, bringing down the net performance boost. This is due to the introduction of longer paths in the graph during compression. Also note that the overall speed-up ratios do not exactly match the reduction in the number of edges. This is due to the fact that both these algorithms perform some bookkeeping operations like zeroing the variables, which require time proportional to the number of nodes. These parts of the algorithm are not sped up, and in fact require slightly more operations in the compressed graphs due to the increased number of nodes.

Results for SALSA are depicted in the tables 1000 and 1100 respectively shown in FIGS. 10 and 11. Again, the algorithms achieve significant speed-up over the uncompressed versions. We observe that in the case of SALSA, the Markov chain method performs better than the Black-box method. This appears to be due to two reasons:

1. The difference in the number of iterations required between the two methods is smaller for SALSA than for PageRank. This is because the convergence rate of SALSA is less sensitive to path lengths.

2. Since SALSA involves push operation in directions opposite to the edges, we need to perform separate passes over out-links and in-links of the virtual nodes. As described above, the Black-box algorithm for SALSA requires distinct orderings of the virtual nodes for the in-link graph and out-link graph. The Markov chain method has a slight advantage here because it can use the same ordering of virtual nodes.

It is also noted that the Markov chain method for SALSA also requires slightly less storage on disk, since it only needs to store one ordering of the virtual nodes.

APPENDIX

Proof of Claim 2

For better readability, let $$a_i(v) = \begin{cases} (1-a) & \text{If } v \in {}_rV_i \\ 1 & \text{If } v \in {}_vV_i \end{cases}$$

be the jump multiplier. Then for any $u \in V_i$, the steady state equation governing $p_{i+1}[u]$ can be written as:

$$p_{i+1}[u] = \alpha j_{i+1}[u] + \sum_{v \in \delta_{in}^{G_{i+1}}(u)} a_{i+1}(v) \frac{\Delta_{G_{i+1}}(u)}{\Gamma_{G_{i+1}}(v)} p_{i+1}[v] \qquad (5)$$

The first term in equation 5 is the contribution made by the jump vector to $p_{i+1}[u]$. But since $j_{i+1}$ is obtained from $j_i$ by simple padding, $j_{i+1}[u] = j_i[u]$.

To analyze the summation in equation 5, we split $\delta_{in}^{G_{i+1}}(u)$ into two parts: Let $Q = V_i \cap \delta_{in}^{G_{i+1}}$ be the set of in-neighbors of u already present in $G_i$. On the contrary $Q' = \delta_{in}^{G_{i+1}} - Q$ is the set of virtual in-neighbors of u that were added during the transformation from $G_i$ to $G_{i+1}$. For $v \in Q$, the edge vu already existed in $G_i$, hence we have:

$$\sum_{v \in Q} a_{i+1}(v) \frac{\Delta_{G_{i+1}}(u)}{\Gamma_{G_{i+1}}(v)} p_{i+1}[v] = \sum_{v \in Q} a_i(v) \frac{\Delta_{G_i}(u)}{\Gamma_{G_i}(v)} p_{i+1}[v] \qquad (6)$$

Nodes in Q' are 'fresh' virtual nodes. Therefore, for a $v \in Q'$, $\delta_{i+1}(v) = 1$. We can expand the term $p_{i+1}[v]$ as follows:

$$\sum_{v \in Q'} a_{i+1}(v) \frac{\Delta_{G_{i+1}}(u)}{\Gamma_{G_{i+1}}(v)} p_{i+1}[v] = \qquad (7)$$

$$\sum_{v \in Q'} \frac{\Delta_{G_{i+1}}(u)}{\Gamma_{G_{i+1}}(v)} \left( \sum_{w \in \delta_{in}^{G_{i+1}}(v)} a_{i+1}(w) \frac{\Delta_{G_{i+1}}(v)}{\Gamma_{G_{i+1}}(w)} p_{i+1}[w] \right)$$

Recall the following properties for $v \in Q'$:

1. From the definition of Q', the in-neighbors of v in $G_{i+1}$ are in fact in-neighbors of u in $G_i$.

2. From the fact that edge-disjoint cliques are chosen for transformation from $G_i$ to $G_{i+1}$, the sets $\delta_{in}^{G_{i+1}}(v)$ are disjoint over $v \in Q'$.

3. From the fact that edges in $G_i$ are preserved as edges and virtual edges in $G_{i+1}$, we have:

$$\bigcup_{v \in Q'} \delta_{in}^{G_{i+1}}(v) = \delta_{in}^{G_i}(u) - Q$$

4. For v is a virtual node, $\Delta_{G_{i+1}}(v) = \Gamma_{G_{i+1}}(v)$.

Using the above, we can now write equation 7 as:

$$\sum_{v \in Q'} a_{i+1}(v) \frac{\Delta_{G_{i+1}}(u)}{\Gamma_{G_{i+1}}(v)} p_{i+1}[v] = \sum_{w \in \delta_{in}^{G_i}(u) - Q} a_i(w) \frac{\Delta_{G_i}(u)}{\Gamma_{G_i}(w)} p_{i+1}[w] \qquad (8)$$

Substituting 6 and 8 in equation 5, we get:

$$p_{i+1}[u] = \alpha j_i[u] + \sum_{v \in \delta_{in}^{G_i}(u)} a_i(v) \frac{\Delta_{G_i}(u)}{\Gamma_{G_i}(v)} p_{i+1}[v]$$

Compare this with the steady state equation governing $p_i[u]$:

$$p_i[u] = \alpha j_i[u] + \sum_{v \in \delta_{in}^{G_i}(u)} a_i(v) \frac{\Delta_{G_i}(u)}{\Gamma_{G_i}(v)} p_i[v]$$

We conclude that the vector $p_{i+1}$ when restricted to nodes in $V_i$ satisfies the same steady state equations as those satisfied by $p_i$. Since these equations uniquely determine $p_i$ up to scaling, we arrive at the statement of Claim 2 above.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable media containing instructions which, when executed by one or more processors disposed in an electronic device, perform a method for speeding tip execution of a web graph algorithm, the method comprising the steps of:

retrieving a compressed representation of a web graph, the compressed representation including real nodes and virtual nodes and having an unique adjacency matrix; and performing multiplication of a vector with the adjacency matrix of the compressed representation.

2. The one or more computer-readable media of claim 1 in which the compressed representation is generated using a bipartite clique-star transformation.

3. The one or more computer-readable media of claim 1 in which the transformation is performed in phases, each phase including mining and transformation of multiple bicliques.

4. The one or more computer-readable media of claim 1 in which the computing comprises assigning a rank R(v) to each virtual node v in the compressed representation according to If u is real for all uv∈E' then R(v)=0 else, $$R(v) = 1 + \max_{u \in \delta_{in}(v) \cap_v V} R(u)$$

where E and E' are adjacency matrices respectively associated with the web graph and compressed representation.

5. The one or more computer-readable media of claim 4 including a further step of reordering rows in an adjacency list in the compressed representation so that adjacency lists of real nodes appear before those of virtual nodes and for the nodes u and v, if R(u)<R(v) then an adjacency list of it appears before an adjacency list of v.

6. The one or more computer-readable media of claim 5 including a further step of computing a score for a virtual node v before pushing scores along out-links of v.

7. The one or more computer-readable media of claim 1 in which the method includes the further steps of computing a score for a node in a web graph and iterating the computing until the algorithm converges, the iterating being performed using power method iteration.

8. The one or more computer-readable media of claim 1 in which the web graph algorithm is PageRank and the vector is calculated using a power method step of $$x_{i+1} = (1-\alpha)E^T(D^{-1}x_i) + \alpha j,$$

where $\alpha$ is a jump probability, j is a jump vector, E is an adjacency matrix of the web graph, D is diagonal matrix such that D(i,i) is an outdegree of vertex i and T is a number of iterations.

9. The one or more computer-readable media of claim 1 in which the web graph algorithm is HITS in which an authority score and hub score are assigned to each node in a query-dependent graph the authority score and hub score being respectively equal to the top eigenvector of $EE^T$ and $E^TE$ where E is an adjacency matrix of the web graph and T is a number of iterations.

10. The one or more computer-readable media of claim 1 in which the web graph algorithm is SALSA in which an authority vector and hub vector are top eigenvectors of $W_r^T W_c$ and $W_c W_r^T$, where $W_r$ and $W_c$ are row and column normalized versions of an adjacency matrix of the web graph and T is a number of iterations.

11. The one or more computer-readable media of claim 1 in which the web graph algorithm is based on one of random walk, eigenvector/spectral method, top singular vectors, or estimation of neighborhood size.

12. One or more computer-readable media containing instructions which, when executed by one or more processors disposed in an electronic device, perform a method for speeding up execution of a web graph algorithm, the method comprising the steps of:

retrieving a compressed representation of a web graph, the compressed representation including real nodes and virtual nodes;

extending the web graph algorithm through modification of Markov chain transition probabilities;

running the extended algorithm directly on the compressed representation; and applying a transformation to a result of the extended algorithm to obtain a stationary vector for the web graph.

13. The one or more computer-readable media of claim 12 in which the web graph algorithm is PageRank and the modification comprises adjusting a probability of a jump transition of any virtual node to be zero to model a jump-adjusted uniform random walk on the web graph.

14. The one or more computer-readable media of claim 13 in which the running comprises computation of a steady state eigenvector of a Markov chain running on the compressed representation using power method iterations.

15. The one or more computer-readable media of claim 12 in which the web graph algorithm is SALSA and the modification comprises adjusting a probability of forward and reverse transitions along an edge in the compressed representation to prohibit alternating authority and hub scores.

16. The one or more computer-readable media of claim 15 in which an authority score a' and hub score h' on the compressed representation are determined using $$a'_{i+1}[u] = \begin{cases} \sum_{v \in \delta_{in}^{G'}(u)} \frac{\Delta_{G'}(u)}{\Gamma_{G'}(v)} h'_i(v) & \text{If } u \text{ is real} \\ \sum_{v \in \delta_{out}^{G'}(u)} \frac{\Lambda_{G'}(u)}{\Phi_{G'}(v)} a'_i(v) & \text{If } u \text{ is virtual} \end{cases}$$

-continued $$h'_{i+1}[u] = \begin{cases} \sum_{v \in \delta^{G'}_{Out}(u)} \frac{\Delta_{G'}(u)}{\Gamma_{G'}(v)} a'_i(v) & \text{If } u \text{ is real} \\ \sum_{v \in \delta^{G'}_{in}(u)} \frac{\Delta_{G'}(u)}{\Gamma_{G'}(v)} h'_i(v) & \text{If } u \text{ is virtual} \end{cases}$$

where $$\frac{\Delta_{G'}(v)}{\Gamma_{G'}(u)}$$

is the probability of the forward transition and $$\frac{\Lambda_{G'}(u)}{\Phi_{G'}(v)}$$

is the probability of the reverse transition.

17. The one or more computer-readable media of claim 12 in which the transformation comprises projecting the result to a set of real nodes and scaling the projection.

18. A machine-implemented method for providing a web graph service, the method comprising the steps of:
generating a virtual node compressed web graph by applying a bipartite clique-star transformation to an original web graph in which compression depth is bounded by a relatively small constant;
extending one or more classes of link-based ranking algorithms for running directly on the virtual node compressed graph without decompression;
running an extended algorithm on the virtual node compressed graph by performing power method iterations until convergence; and
using results of the extended algorithm to perform web page rankings.

19. The machine-implemented method of claim 18 in which the classes of link-based ranking algorithms are extended by one of Black-box adjacency matrix multiplication or adjustment to Markov chain transition probabilities.

20. The machine-implemented method of claim 18 in which the extended algorithms runs with an increase in speed over a non-extended version in approximate proportion to the compression depth.

* * * * *